Aug. 8, 1967  P. A. LATHAM ET AL  3,334,797
CONTAINERS WITH TEAR STRIP CLOSURES
Filed July 1, 1965  4 Sheets-Sheet 1

INVENTORS
Peter A. Latham
Paul E. Brefka
BY
James P. Snowden
ATTORNEY

Aug. 8, 1967 P. A. LATHAM ET AL 3,334,797
CONTAINERS WITH TEAR STRIP CLOSURES
Filed July 1, 1965 4 Sheets-Sheet 2

INVENTORS
Peter A. Latham
Paul E. Brefka
BY
James F. Snowden
ATTORNEY

Aug. 8, 1967 P. A. LATHAM ET AL 3,334,797
CONTAINERS WITH TEAR STRIP CLOSURES
Filed July 1, 1965 4 Sheets-Sheet 3

INVENTORS
Peter A. Latham
Paul E. Brefka
BY
James P. Snowden
ATTORNEY

Aug. 8, 1967  P. A. LATHAM ET AL  3,334,797
CONTAINERS WITH TEAR STRIP CLOSURES
Filed July 1, 1965  4 Sheets-Sheet 4
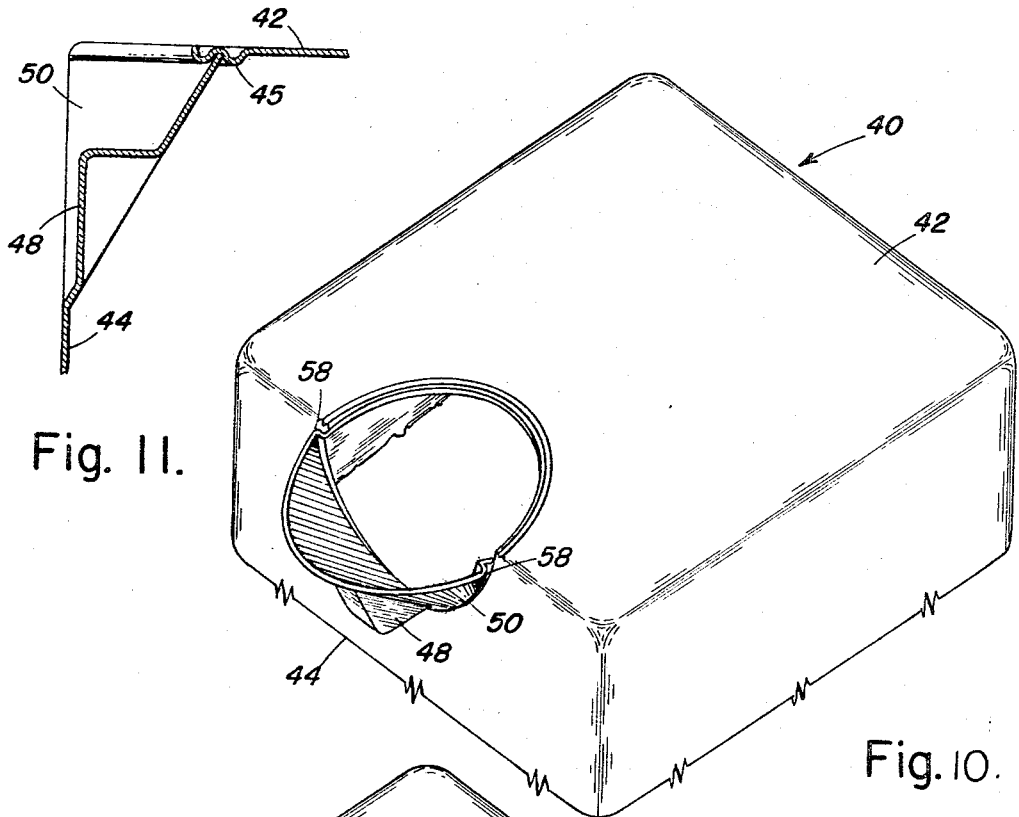
Fig. 11.
Fig. 10.
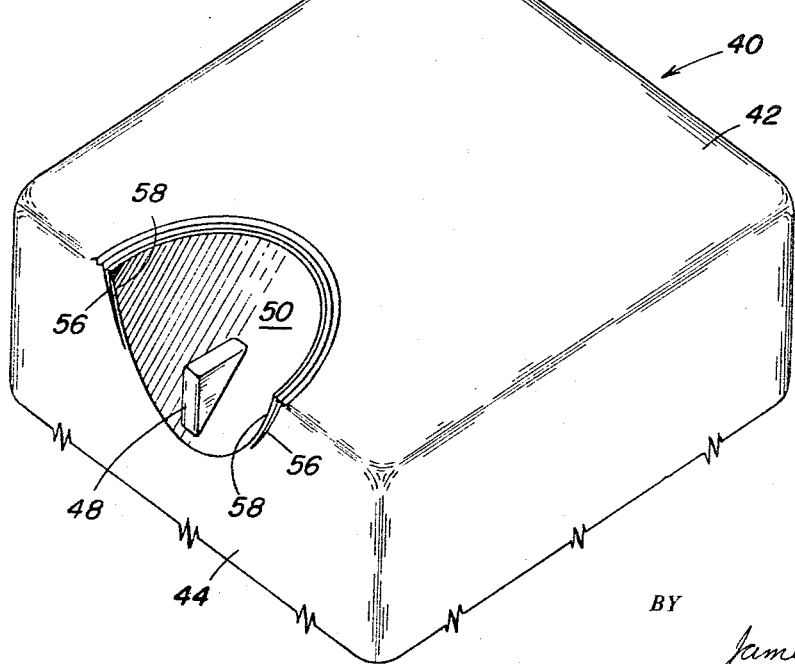
Fig. 9.
INVENTORS
Peter A. Latham
Paul E. Brefka
BY *James F. Snowden*
ATTORNEY United States Patent Office 3,334,797
Patented Aug. 8, 1967

3,334,797
CONTAINERS WITH TEAR STRIP CLOSURES
Peter A. Latham, Stow, and Paul E. Brefka, Framingham, Mass., assignors, by mesne assignments, to Mobil Oil corporation, a corporation of New York
Filed July 1, 1965, Ser. No. 468,732
16 Claims. (Cl. 229—7)

The invention relates to hollow containers having an integral closure including a tear strip.

The molding or forming of hollow articles from sheets or strips of thermoplastic materials is a well developed art, and hollow plastic containers have been used rather widely in recent years. However, the use of such containers has been restricted by the cost and characteristics of the plastic composition. Disposable containers of substantial size intended for modestly priced food products (e.g.) milk, beverages or the like should be manufactured with a minimum amount of the plastic material to minimize cost considerations. For instance, milk containers formed from high impact modified polystyrene should not have an average wall thickness greater than about 30 mils (0.030 inch) currently, if such containers are to successfully compete with containers presently formed from paper and glass.

While containers prepared from high impact modified polystyrene and other thermoplastic compositions possess adequate physical strength in thin sections of the material, many difficult problems arise in respect to the closures or other sealing devices employed with those containers, particularly in the case of an integral closure or a permanently attached closure. As a result, most of the thin walled plastic containers are currently equipped with separate closures. There is always a continuing demand for improved containers and closures, especially those constructed of plastic materials.

The containers and closures of the present invention possess many advantages. They are simple and inexpensive. By reason of forming the closure as an integral part of the container fewer manufacturing operations are required. That is, the complete closure component or section can be formed entirely during the shaping operation wherein the container body is manufactured. This permits the efficient utilization of the mass production manufacturing techniques common in the plastic molding industry. The resulting closure forms a fluid-tight or hermetic seal which is quite resistant to damage and careless handling prior to opening the container. Moreover, the closure sections can be wholly or partially recessed in the overall container structure and so provide highly desirable packing characteristics. Such containers may be easily opened by tearing off the tear strip which is an integral part of the container without requiring any of the opening devices generally employed in opening containers. The novel containers are particularly suitable for uses in which their fluid or dry contents are removed or poured out in small portions from time to time as the closure cover or lid remains permanently attached to the container in certain embodiments of the invention, since it is impossible to lose or misplace the closure after the container has been opened. Also, in at least some embodiments of the invention, the cover or lid may be reclosed or resealed by engagement with a latching means. In one type of container disclosed herein, the closure cover or lid has a reversible curvature and the lid also serves as a pouring spout in the open position. Other benefits of the invention will be apparent to those skilled in the art upon consideration of the detailed disclosure which follows.

Broadly, the present invention relates to a hollow container having top and side walls which comprises an integral closure section including a closure cover and a tear strip adjoining said closure cover and scored for tearing along the junction of said cover and said tear strip. Other features of the invention include a spout along one side of the container, an outwardly extending lip on the spout which provides an internal groove therein suitable for engaging the edge of the closure cover in reclosing the container after use, the type and disposition of the tear strip and score lines for tearing; a pull tab on the cover and the provision of an integral hinge means for retaining the cover and permitting it to swing open after removal of the tear strip.

The invention also includes an embodiment equipped with a recessed closure cover sloping inwardly and upwardly from a side wall and having a substantially concave transverse cross-section suitable for reversal of the closure curvature to form a pouring spout projecting from the side wall, preferred angles of inclination for the sloping cover and the degree of concavity thereof, and the provision of grooves in the upper side wall immediately adjacent to each side of the closure cover to facilitate springing the closure cover open and retaining the cover in its position after it has been opened. Still other features of the invention will be apparent to those skilled in the art after consideration of the detailed disclosure hereinafter.

For a better understanding of the nature and objects of this invention, reference should be had to the accompanying drawings illustrating certain preferred embodiments of the invention and in which like reference numerals designate like parts in all figures of the drawing. FIGS. 1 to 5, inclusive, depict one type of closure; and FIGS. 6–11, inclusive, show another form of closure on a container according to the invention.

FIG. 9 is an isometric view of the top of the container of FIG. 6 illustrating the closure cover after removal of the tear strip.

FIG. 10 is a similar isometric view of the same container showing the closure cover opened as a pouring spout.

FIG. 11 is a section, similar to FIG. 8, taken on the line 8—8 of FIG. 7 but illustrating the closure cover fastened in the resealed position subsequent to removal of the tear strip.

Thermoplastic or thermoelastically deformable materials are especially suited for the formation of the containers and closures according to the present invention. It will be appreciated that the type of thermoplastic material used is generally determined by the economics and duty in which the container will eventually be placed. Among the many thermoplastic resins suitable for various such containers are high impact polystyrene, polybutadiene, styrene-butadiene blends or copolymers, polyvinyl chloride and related vinyl polymers, polyallomers, nylon, formaldehyde polymers, polyethylene, polypropylene, nitrocellulose, cellulose acetate, cellulose propionate, cellulose acetate-butyrate, polymethylmethacrylate, ethylcellulose, benzyl cellulose and ether-esters of cellulose.

From the standpoint of economy in the amount of resin used in a container and minimizing the weight thereof in order to minimize the shipping costs, thin containers in which the walls and other elements of the container are about 10 to 40 mils thick are preferred for many purposes. The present invention is particularly suitable for containers of such thickness; however, considerable heavier sections of material may be utilized if so desired. In any event, certain parts of the closure section, such as hinge strips and combination cover-spout elements, should be sufficiently flexible for the closure to be opened without any substantial cracking occurring. Such flexibility is readily obtainable by selecting a thermoplastic material of a composition to provide the appropriate characteristics and also by forming, molding or shaping the material so that the critical elements of the closure are thin enough to have the desired flexibility. In addition, in those instances where it is desired to have a container in which the closure may be reclosed after using only a portion of the contents of the container, the closure cover should desirably have sufficient resilience to hold its shape well enough to firmly engage a latching means such as a lip, groove or ridge inside the container. Moreover, in one embodiment of the invention, the closure cover also serves as a pouring spout, and the material of the cover desirably has sufficient resilience and flexibility for springing into a position of reverse curvature and remaining in the sprung open position as a pouring spout.

The structural features of this invention readily lend themselves to the manufacture of hollow, thin walled containers by thermoforming techniques in which a sheet of thermoplastic material is preheated to a softened or plastic state and then shaped or formed on a mold under a fluid pressured differential (e.g. vacuum forming, etc.). In forming the tear strip closures of the present invention, the thermoforming process and equipment described in the concurrently filed application of C. H. Leiper et al. entitled "Thermoforming Method and Apparatus" has been found particularly suitable.

Figure 1:
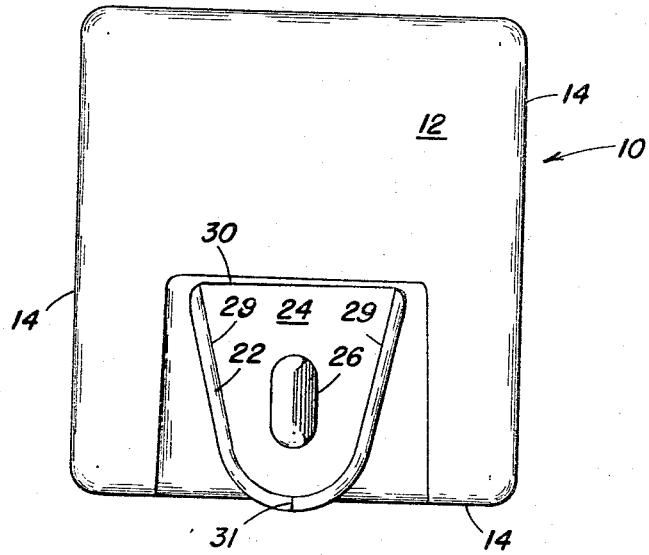
FIG. 1 is a plan view of one embodiment of a container.
Figure 2:
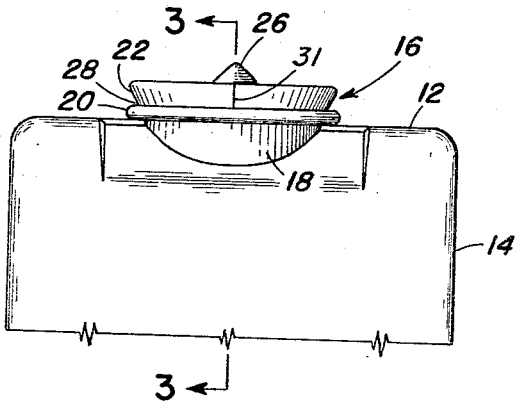
FIG. 2 is a fragmentary front elevation of this container.

Referring now to FIGS. 1 and 2 of the drawings, one embodiment of a container according to this invention is designated as 10 and it is provided with a top wall 12, side walls 14 and a closure section generally indicated as 16. The latter is an integral component of the container body and it includes a spout 18, a lip or bead 20 extending outwardly on the spout, a tear strip 22, a closure cover 24 and a lifting or a pull tab 26 for the lid 24.

A typical hollow container of this nature with a wide range of uses may be formed from a high impact polystyrene composition containing a major percentage of styrene copolymerized with a minor proportion of a rubbery or elastomeric copolymer, as exemplified by the product of copolymerizing 87% styrene monomer with 13% of polybutadiene.

Figure 3:
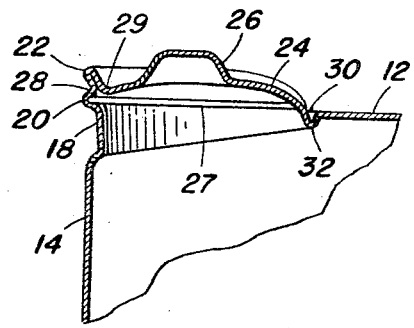
FIG. 3 is a cross section of the closure taken along the line 3—3 of FIG. 2.

Turning now to FIG. 3, it will be apparent that the hollow container has a comparatively thin wall section typically averaging between about 10 and 30 mils in thickness, and that the configuration of the outwardly extending lip or bead 20 on the pouring spout also provides a complementary internal groove 27 within the spout 18. The projecting lip 20 performs the useful functions of minimizing dripping in the pouring operation and making the spout more rigid. The removable tear strip 22 extends around the upper periphery of spout 18 except along the rear thereof. Strip 22 forms an unbroken or intact seal along the junction between cover 24 and the lip 20 of the pouring spout strong enough to withstand the handling occurring during filling, shipping and storage of the container, yet it should also be readily removable by the consumer in opening the container, preferably by the application of only moderate force with the hands alone. This is accomplished by a score line or groove 28 in the exterior face of the tear strip 22 extending partly but not entirely through the thickness of the thermoplastic material. The score line 28 is disposed along a substantial length (preferably the entire length) of the junction of spout lip 20 and tear strip 22. The preferred tear strip is in the form of the single fold or double layer of thermoplastic material, as shown in FIG. 3, and in this case, the exposed face of the other layer of tear strip 22 is similarly scored for a similar length along the adjoining line 29 which forms the junction of the tear strip 22 and the cover 24. The pinched or scored lines 28 and 29 both have a substantially equal thickness of material remaining at the bottom of each groove to preserve the hermetic seal until the container is intentionally opened. The total thickness of material to be torn by the user and its physical properties are important factors in determining the ease of tearing it. In general, a total thickness of about 3 to 7 mils is suitable for articles produced by thermoforming various polystyrene compositions. For the particular polybutadiene modified polystyrene resin specified hereinbefore, a total thickness of about 3 to 5 mills of unbroken plastic material is desirably left at the bottom of the two adjacent grooves 28 and 29 in scoring or pinching the tear strip fold of the thermoformed container (i.e., the sum of the remaining thicknesses of both layers along said line totals about 3 to 5 mils).

In addition, a similar starting tear line is provided in the front center 31 of tear strip 22, which extends from the exterior edge of the tear strip down both exposed faces thereof to a junction with score lines 28 and 29. The score line 31 facilitates the operation of tearing off the removable tear strip 22, but it is an optional feature for the tearing off of the tear strip may be started at either end of the score lines 28 and 29 at the rear of the tear strip.

After the removal of the tear strip 22, the rear junction 30 of the cover 24 and top wall 12 of the container remains unbroken in one preferred embodiment of the invention, as the juncture functions as a hinge which permits opening lid 24 and avoids any possibility of the lid being lost or misplaced. While this junction line or strip may be simply a continuation of the flat top wall 12, it is preferable in some instances to provide a U-bend or fold 32 of material extending downward into the container, for the U-bend tends to minimize or relieve stresses in the material across the junction 30 created by swinging the closure lid 24 backward to its open position and also tends to reduce the tendency of the open lid to automatically return to its original closed position.

Figure 4:
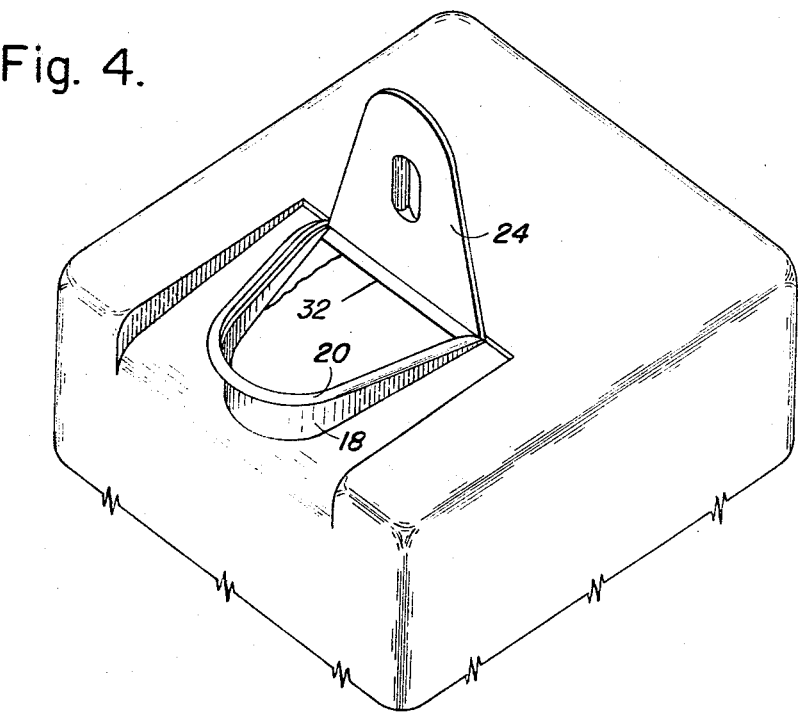
FIG. 4 is an isometric view of the top of the same container illustrating the closure cover in open position after removal of the tear strip.
Figure 5:
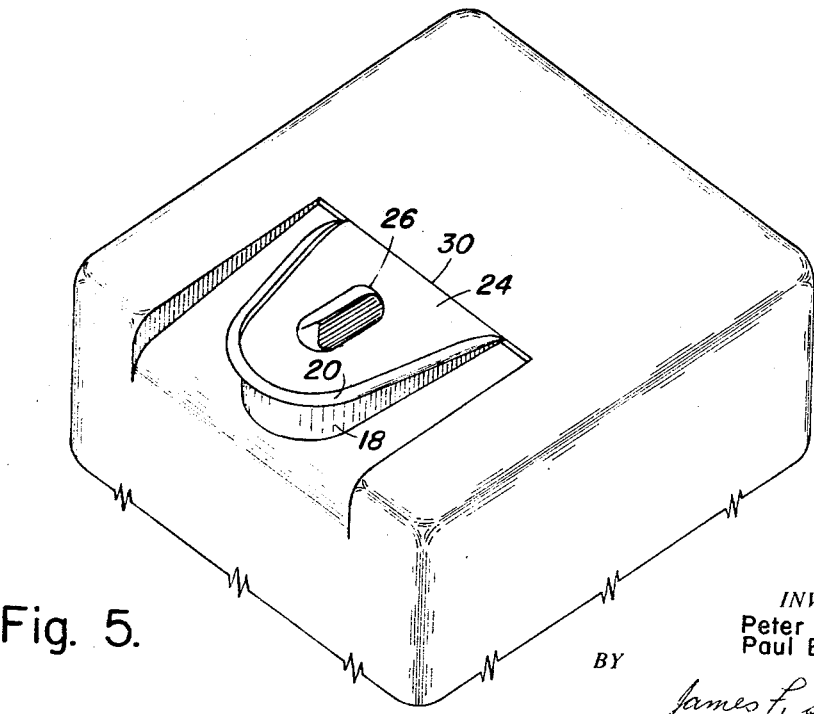
FIG. 5 is a similar isometric view showing the closure cover in its resealed position.

In FIG. 4 the container 10 is illustrated as open and ready for pouring with the tear strip 22 removed and the closure cover 24 in a raised position. If any of the contents of the container remain after pouring, it may be closed to an essentially splash-proof condition by engaging the edge of the cover 24 in the internal groove 27 of spout 18 where it is retained as shown in FIG. 5. In some instances it may be desirable to reverse the curvature on the dome shaped lid 24 of FIG. 3 by pressing down on the center of the cover while its edge is engaged in the groove 27 with enough force to "dish" the cover inwardly. This procedure is sometimes referred to as "oil-canning" or "doming" and it appears to lessen the possibility of the closure cover 24 being opened by the impact of a surging liquid in the container.

FIGS. 6 to 11 inclusive are concerned with another embodiment of the invention in which the recessed cover of the integral closure section also functions as a protruding pouring spout by reason of its configuration and reversible curvature.

Figure 6:
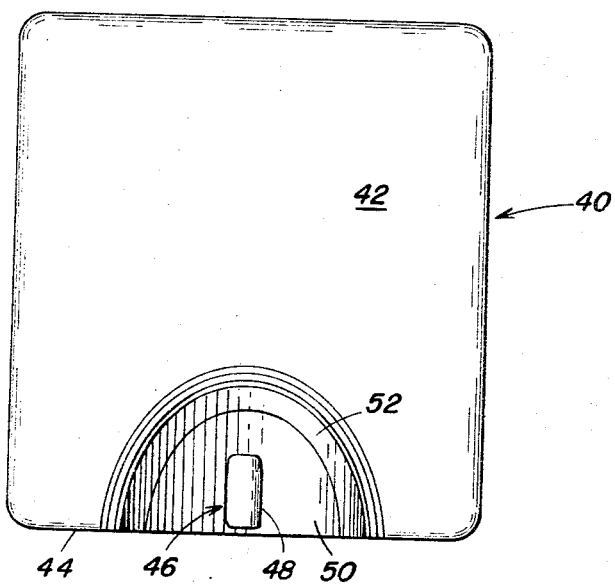
FIG. 6 is a plan view of another embodiment of a container and integral closure according to this invention.
Figure 7:
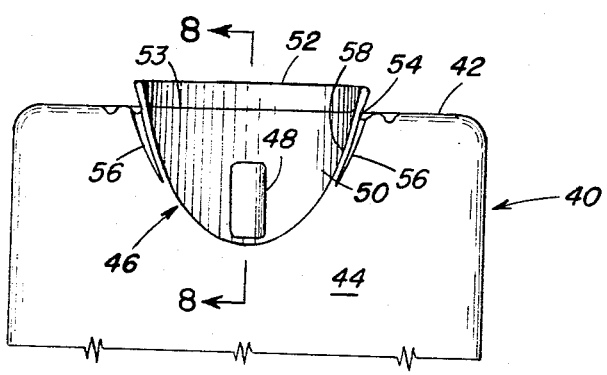
FIG. 7 is a fragmentary front elevation of this container.

This container generally indicated as 40 in FIGS. 6 and 7 has a top wall 42, front wall 44, and a closure section with the overall designation 46. The closure is equipped with a pull tab 48 located on the closure cover 50, and the tab is set back a short distance from the side wall 44 at the front of the container body. This setback is highly desirable to avoid stiffening the closure lid inasmuch as the closure cover 50 is designed to be sprung outward in actual use for pouring.

Cover 50 is of concave configuration in the embodiment set forth in the drawings. More specifically, this closure cover 50 has the shape of the area of intersection of the surface of a tilted cylinder and the body of an upright cube with the axis of the cylinder inclined at an angle of 45° from the vertical and intersecting the cube only at the center of a horizontal upper edge of the cube at an angle of 90°. Thus the lid or cover 50 slopes upward at a constant angle of inclination of 45°, it has a transverse cross section (i.e., in a plane perpendicular to said inclination or to the axis of said cylinder) in the form of a circular arc of 180° and it joins a tear strip 52 at the top wall 42 of the article along the score line or groove 53. Tear strip 52 stands about ⅜ of an inch in height, and it is in the form of a single fold or double-walled section which is provided with another score line or groove 54 on its other exposed face. These score lines are similar to lines 28 and 29 and the intact tear strip 52 serves the same purpose as strip 22 of the closure of FIGS. 1–5.

Figure 8:
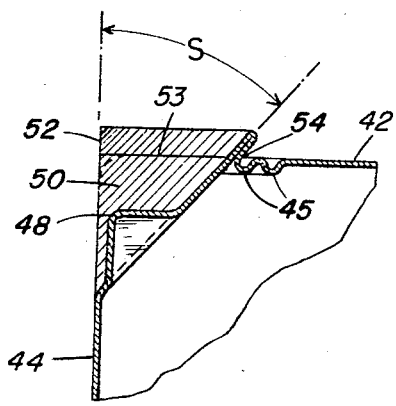
FIG. 8 is a sectional elevation of the closure taken along the line 8—8 of FIG. 7.

The top wall 42 has one or more grooves extending around and immediately outside the junction or intersection of the closure cover 50 and the top wall in order to provide one or more ribs or ridges 45 on the underside of the top wall 42 as shown in FIG. 8. These ridges 45 are designed for latching the cover 50 in a closed position after the container has been opened as described hereinafter. Also in FIG. 7 is shown a groove 56 in the front wall 44 disposed along each of the curved sides of cover 50 and extending about halfway down and closely adjacent to the curved intersection of cover 50 and wall 44. These front wall grooves serve as a hinge and a latching means for facilitating the curvature reversal necessary in springing out the cover 50 as a pouring spout and also in holding it in the projecting spout position.

FIG. 9 depicts the appearance of the top of this embodiment of the container after the tear strip 52 has been removed by grasping it at one end thereof and tearing completely around the arc. Then the container is sprung open into the pouring position shown in FIG. 10 by simply pulling outward on the tab 48 with the grooves 56 in the front side yielding enough to permit the front corners 58 of the cover (i.e., the intersections of cover 50 with each side of front wall 44) to flex outwardly and somewhat farther apart laterally as illustrated in FIG. 10. In other words, the flexing characteristics of grooves 56 provide sufficient hinge action to allow the curvature reversal and also relieve the stresses at the corners 58 resulting from the reversal of the concave curvature to a convex curvature sufficiently to allow the cover 50 to remain in the open position without snapping back during pouring.

FIG. 11 illustrates the cover 50 in a reclosed and splash-proof position after use. When only a portion of the contents are needed and it is desired to preserve the remainder in the container, the tab 48 is pushed backward and slightly downward to change the curvature of the combination cover-spout 50 to its original concave curvature and latch its upper edge inside the top 42 of the container by engaging it behind one of the ridges 45 or in a groove between two such internal ribs.

In its recessed position as shown in FIG. 9 the reversible cover 50 has a shape that is probably best defined as substantially concave in transverse cross section and inclined upwardly and inwardly from a front or side wall of the container to the top wall thereof at a substantially constant inclination. The angle of inclination is illustrated as the angle S in FIG. 8. This slope or inclination may be defined as the angle in a vertical plane between the general slope of cover 50 measured in the center thereof and the front wall extended upward, ignoring the tab 48 the purpose of this description. While this angle S may vary somewhat along this slope of cover 50, nothing is gained thereby and a considerable change of the slope is undesirable. For example, a closure cover 50 of spherical configuration is greatly inferior to that illustrated in FIGS. 6–11.

The preferred transverse cross section of the closure cover 50 is a semicircular arc of 180° (i.e., an arc subtending an angle of 180°). In most cases it is preferable not to substantially exceed this length or extent of arc as that will introduce a substantial reverse curvature into the recessed cover lid which is likely to be difficult to reverse and form into a pouring spout of convex configuration. However, covers having transverse cross sections in the form of arcs smaller than 180° are suitable when appropriate provision is made to minimize snapping back to the closed position.

However, the shape of cover 50 is not limited to portions of cylindrical surfaces as the surface may also be that created by the intersection of a tilted cone (base either up or down) with horizontal edge of a generally rectangular body or the cover 50 may have a transverse cross section like that of a parabola or a hyperbola. On the other hand, sharp bends or angles in the transverse cross section of the cover should generally be avoided and the same is true of substantial flat areas in the surface of the cover as these do not lend themselves to the curvature reversal necessary in changing the recessed cover into a projecting spout.

In general, it appears that the slope angle S (FIG. 8) should desirably be between 15 and 60 degrees and the best results of this embodiment of the invention are apparently obtained with a constant angle in the range of about 30 to 60 degrees.

A score line thickness, that is the total thickness of material remaining along the line to be torn on the tear strip, in the range of about 3 to 7 mils may be used in many cases, and the optimum scoring for any particular resin composition can be readily determined by experimentation.

It is also contemplated that in other embodiments of the invention the tear strip and the score lines thereon may extend completely around the closure cover so that the cover is completely removed for pouring. This type would be suitable for uses wherein a container is emptied on a single occasion.

While the present invention has been disclosed in considerable detail for purposes of illustration, it will be readily apparent to those skilled in the art that many other embodiments fall within the purview of this invention. Accordingly, this invention should not be construed as limited in any particulars except as may be recited in the appended claims or required by the prior art.

We claim:

1. A hollow container having top and side walls which comprises an integral and sealed closure section including a closure cover, a spout and an intact folded tear strip connecting said closure cover and said spout, said spout being disposed along a side wall of said container, said closure cover being disposed along said top wall and extending toward said spout, and said tear strip having both faces of said fold scored for tearing along at least a substantial length of a junction of said spout and said closure cover.

2. A container according to claim 1 in which said tear strip is removable and scored for tearing along at least a substantial length of the junction of said spout and said closure cover and further scored for tearing along a line extending across said tear strip from an external edge thereof to said scored junction.

3. A container according to claim 1 in which said spout is provided with an outwardly extending lip and an internal groove extending around a substantial part of the upper periphery of said spout; and said internal groove is adapted to engage the edge of said closure cover after removal of said tear strip.

4. A container according to claim 1 in which said closure cover is provided with a pull tab.

5. A container according to claim 1 in which an integral hinge means for said closure cover is disposed along at least a part of a junction of said closure cover and said top wall.

6. A container according to claim 1 in which at least a portion of the edge of said closure cover is joined to said top wall by an internal hinge means in the form of a flexible fold of material depending from said top wall.

7. A hollow container which comprises top and side walls; an integral closure cover disposed along said top wall and having a pull tab thereon; an integral spout disposed along and extending from a side wall; an outwardly extending and integral lip disposed along the upper periphery of said spout and forming a complementary internal groove within said spout; an integral folded tear strip connecting said closure cover and said spout in which both external faces of the fold are scored for tearing along at least a substantial length of the junction of said closure cover and said spout and further scored for tearing across said strip from an external edge thereof to said scored junction; and an integral hinge means disposed along a junction of the rear of said closure cover and said top wall.

8. A hollow container which comprises an integral closure section including a recessed closure cover sloping inwardly and upwardly from a side wall of said container to a top wall thereof at a substantially constant inclination relative to said side wall, and a tear strip adjoining an upper edge of said closure cover and scored for tearing along a substantial length of the junction with said closure cover having a substantially concave transverse cross section suitable for reversal of the curvature thereof to form a pouring spout of substantially convex transverse cross section projecting from said side wall after removal of said tear strip.

9. A container according to claim 8 in which said closure cover is provided with a pull tab.

10. A container according to claim 8 in which the angle of said inclination is between about 15 and 60°.

11. A container according to claim 8 in which the angle of said inclination is between about 30 and 60°.

12. A container according to claim 8 in which said transverse cross section of the closure cover is in the form of a substantially circular arc not subtantially exceeding 180°.

13. A container according to claim 8 in which said tear strip is scored for tearing along the intersection of said closure cover and said top wall.

14. A container according to claim 8 in which the exterior face of said side wall is provided with a groove closely adjacent to each side of said closure cover and evenly spaced outside the upper portion of the junction of said closure cover and said side wall.

15. A container according to claim 8 in which the inner face of said top wall is provided with a rib immediately adjacent to the intersection of said closure cover and said top wall, and said internal rib is disposed and arranged to engage and fasten said closure cover in a closed position.

16. A hollow container which comprises an integral closure section including a recessed closure cover of resilient material sloping inwardly and upwardly from a side wall of said container to a top wall thereof at a substantially constant inclination between about 30 and 60° relative to said side wall; a pull tab on said closure cover; a removable, intact, singly folded, tear strip having both exterior faces of said fold scored for tearing along the intersection of an upper edge of said closure cover and said top wall; said closure cover having a substantially arcuate transverse cross section subtending an angle not substantially greater than 180° and suitable for reversal of the curvature thereof to form a pouring spout of substantially convex transverse cross section projecting from said side wall after removal of said tear strip; grooves in the exterior face of said side wall adjacent to each side of said closure cover and evenly spaced outside the upper portions of the junction of said closure cover and side wall to facilitate and retain said curvature reversal; and a ridge on the inner face of said top wall extending along a substantial length of the intersection of said closure cover and said top wall and adjacent to said intersection, said internal ridge being arranged to engage and fasten said closure cover in a closed position after use as a pouring spout.

References Cited

UNITED STATES PATENTS

| | | | |
|---|---|---|---|
| 3,047,179 | 7/1962 | Madej | 215—73 |
| 3,154,226 | 10/1964 | Petitto | 229—7 |
| 3,227,330 | 1/1966 | Sadler | 222—541 |
| 3,260,425 | 7/1966 | Moran | 222—541 |
| 3,262,627 | 7/1966 | Kersh et al. | 229—7 |

FOREIGN PATENTS 1,136,987  5/1957  France.

JOSEPH R. LECLAIR, *Primary Examiner.*

R. PESHOCK, *Assistant Examiner.*

UNITED STATES PATENT OFFICE

CERTIFICATE OF CORRECTION

Patent No. 3,334,797                              August 8, 1967

Peter A. Latham et al.

It is hereby certified that error appears in the above numbered patent requiring correction and that the said Letters Patent should read as corrected below.

In the heading to the printed specification, line 5, for "corporation", first occurrence, read -- Corporation --; column 1, line 9, for "The" read -- This --; column 4, line 23, for "mills" read -- mils --; column 6, line 74, for "Acontainer" read -- A container --; column 7, line 13, for "internal" read -- integral --.

Signed and sealed this 12th day of November 1968.

(SEAL)
Attest:

Edward M. Fletcher, Jr.
Attesting Officer

EDWARD J. BRENNER
Commissioner of Patents